(12) United States Patent
Edamitsu et al.

(10) Patent No.: US 11,506,832 B2
(45) Date of Patent: Nov. 22, 2022

(54) PLANAR ILLUMINATION DEVICE WITH LIGHT GUIDE PLATE WITH PSEUDO LIGHT SOURCES

(71) Applicant: MINEBEA MITSUMI Inc., Nagano (JP)

(72) Inventors: Takashi Edamitsu, Kitasaku (JP); Satoshi Sugawara, Kitasaku (JP); Kai Wu, Kitasaku (JP); Masao Miyamoto, Kitasaku (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/429,492

(22) PCT Filed: Dec. 4, 2019

(86) PCT No.: PCT/JP2019/047503
§ 371 (c)(1),
(2) Date: Aug. 9, 2021

(87) PCT Pub. No.: WO2020/170548
PCT Pub. Date: Aug. 27, 2020

(65) Prior Publication Data
US 2022/0146743 A1    May 12, 2022

(30) Foreign Application Priority Data

Feb. 21, 2019 (JP) .............................. JP2019-029317
Jul. 10, 2019 (JP) .............................. JP2019-128412

(51) Int. Cl.
*F21V 8/00* (2006.01)
*F21Y 105/10* (2016.01)

(52) U.S. Cl.
CPC ......... *G02B 6/0068* (2013.01); *G02B 6/0021* (2013.01); *G02B 6/0055* (2013.01); *F21Y 2105/10* (2016.08)

(58) Field of Classification Search
CPC .. G02B 6/0021; G02B 6/0055; G02B 6/0068; F21V 11/14; F21Y 2105/10; G02F 1/133603
See application file for complete search history.

(56) References Cited

U.S. PATENT DOCUMENTS

| 10,578,789 B2 * | 3/2020 | Ngai ......................... F21V 5/02 |
| 2009/0237593 A1 * | 9/2009 | Hoshi .................. G02B 6/0068 362/330 |

(Continued)

FOREIGN PATENT DOCUMENTS

| JP | 2007-227286 A | 9/2007 |
| JP | 2010-272245 A | 12/2010 |

(Continued)

OTHER PUBLICATIONS

Takahashi et al., Backlight Unit and Liquid Crystal Display Equipped With This, JP2010272245A, 2010, Espacenet English Translation, https://worldwide.espacenet.com/patent/search/family/043420131/publication/JP2010272245A?q=pn%3DJP2010272245A (Year: 2010).*

(Continued)

*Primary Examiner* — Elmito Breval
*Assistant Examiner* — Michael Chiang
(74) *Attorney, Agent, or Firm* — Pearne & Gordon LLP (57) ABSTRACT

A planar illumination device according to embodiments includes a substrate and a light guide plate. The substrate has a plurality of light sources arranged two-dimensionally. The light guide plate is disposed on a side of the surface of the substrate, the surface having the light sources. The light guide plate has a plurality of through holes disposed in a (Continued)

thickness direction and individually accommodating the light sources, and a pseudo light source. The pseudo light source is disposed such that another pseudo light source is not disposed on a line connecting the center of the pseudo light source and the center of one of the light sources.

16 Claims, 8 Drawing Sheets

(56) References Cited

U.S. PATENT DOCUMENTS

| | | | | |
|---|---|---|---|---|
| 2010/0127289 | A1* | 5/2010 | Helbing | H01L 33/508 445/63 |
| 2011/0037740 | A1 | 2/2011 | Yamaguchi | |
| 2012/0176813 | A1* | 7/2012 | Holten | G02B 6/0055 362/606 |
| 2013/0077345 | A1* | 3/2013 | Sato | F21V 11/14 362/609 |
| 2014/0160720 | A1* | 6/2014 | Seuntiens | G02B 6/005 362/2 |
| 2015/0176810 | A1* | 6/2015 | Mitchell | G02B 6/00 362/293 |
| 2015/0377425 | A1* | 12/2015 | Van Bommel | F21K 9/60 362/293 |
| 2021/0382354 | A1* | 12/2021 | Shinomiya | H01L 33/62 |

FOREIGN PATENT DOCUMENTS

| | | |
|---|---|---|
| JP | 2010272245 A * | 12/2010 |
| WO | 2006/107105 A1 | 10/2006 |
| WO | 2010/070885 A1 | 6/2010 |

OTHER PUBLICATIONS

International Search Report for corresponding International Application No. PCT/JP2019/047503 dated Feb. 25, 2020.

Written Opinion for corresponding International Application No. PCT/JP2019/047503 dated Feb. 25, 2020.

English translation of the Written Opinion International Preliminary Report on Patentablility for corresponding International Application No. PCT/JP2019/047503 dated Aug. 3, 2021.

* cited by examiner

PLANAR ILLUMINATION DEVICE WITH LIGHT GUIDE PLATE WITH PSEUDO LIGHT SOURCES

CROSS-REFERENCE TO RELATED APPLICATIONS

This application is a U.S. National Stage application that claims the benefit of PCT Application PCT/JP2019/047503, filed on Dec. 4, 2019, which claims the benefit of Japanese Application Nos. 2019-029317 and 2019-128412 filed Feb. 21, 2019 and Jul. 10, 2019, respectively, the entire disclosures of which are hereby incorporated herein by reference.

FIELD

The present invention relates to a planar illumination device.

BACKGROUND

Planar illumination devices for use as backlights in liquid crystal displays and the like include direct-type planar illumination devices, in which small light sources such as light-emitting diodes (LEDs) are arranged in an array on a substrate and an optical sheet is arranged thereon (for example, see Patent Literatures 1 to 3).

In such a direct-type planar illumination device, unevenness in brightness tends to occur because the light sources are point light sources having directivity and the portions around the light sources become brighter even though light is passed through the optical sheet.

To suppress such unevenness in brightness, the following methods are commonly employed:

a method that arranges a large number of light sources and narrows the spacing (pitches) between the light sources; and a method that increases the distance between the light sources and the optical sheet.

CITATION LIST

Patent Literature

Patent Literature 1: International Publication No. WO 2010/070885

Patent Literature 2: Japanese Patent Application Laid-open No. 2007-227286

Patent Literature 3: International Publication No. WO 2006/107105

SUMMARY

Technical Problem

Unfortunately, first, the method that arranges a large number of light sources and narrows the spacing between the light sources increases the number of LEDs and the like serving as the light sources and incurs a cost increase of the planar illumination device. Second, the method that increases the distance between the light sources and the optical sheet increases the thickness of the planar illumination device and fails to meet the need for reducing the thickness. As discussed above, there is a tradeoff between cost reduction by reducing the number of light sources and reduction in thickness.

The present invention has been made in view of the above and it is an object of the present invention to provide a planar illumination device capable of reducing unevenness in brightness without increasing the number of light sources or the thickness of the device.

Solution to Problem

It is an object of the present invention to at least partially solve the problems in the conventional technology. A planar illumination device according to an embodiment of the present invention includes a substrate and a light guide plate. The substrate has a plurality of light sources arranged two-dimensionally. The light guide plate is disposed on a side of a surface of the substrate, the surface having the light sources. The light guide plate has a plurality of through holes being arranged in a thickness direction and individually accommodating the light sources, and a pseudo light source. The pseudo light source is arranged such that another pseudo light source is not arranged on a line connecting a center of the pseudo light source and a center of one of the light sources respectively, and another pseudo light source is allowed to be arranged on a line connecting a center of the pseudo light source and a center of another of the light sources respectively.

In the planar illumination device according to an embodiment of the present invention, unevenness in brightness can be reduced without increasing the number of light sources or the thickness of the device.

DESCRIPTION OF EMBODIMENTS

A planar illumination device according to embodiments will be described below with reference to the drawings. It should be noted that the present invention is not limited by these embodiments. Furthermore, the dimensional relation between each element and the ratio of each element in the drawings may be different from the actual ones. Some portions with different dimensional relation or ratio may also be included between the drawings. A description in an embodiment or a modification is basically applied similarly to other embodiments and modifications.

First Embodiment

Figure 1A:
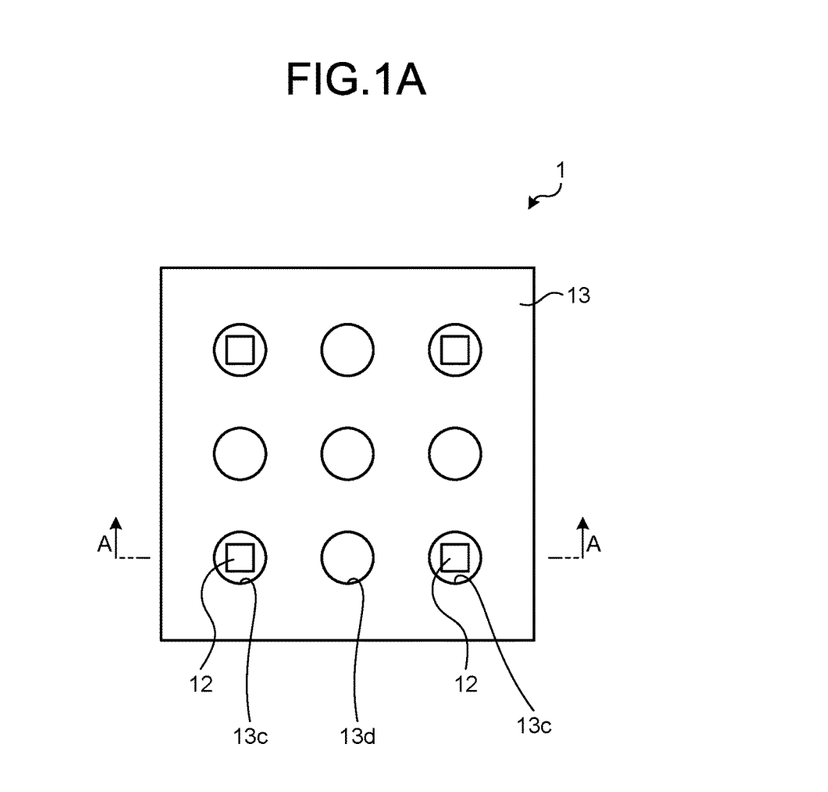
FIG. 1A is a first diagram illustrating a configuration example of a planar illumination device according to a first embodiment.
Figure 1B:
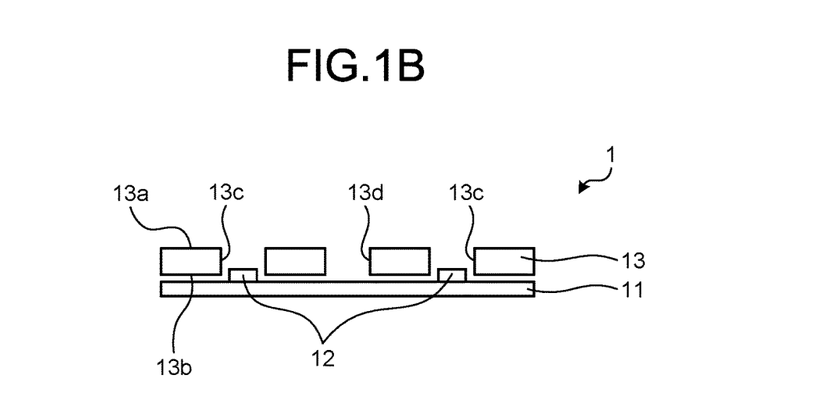
FIG. 1B is a second diagram illustrating a configuration example of a planar illumination device according to the first embodiment.

FIG. 1A and FIG. 1B are diagrams illustrating a configuration example of a planar illumination device 1 according to a first embodiment, in which FIG. 1A is a plan view (top view) of the planar illumination device 1 and FIG. 1B is an end elevation view along A-A in FIG. 1A. In FIG. 1A and FIG. 1B, the planar illumination device 1 includes a substrate 11, light sources 12, and a light guide plate 13. The substrate 11 is configured with an insulating flat plate having a substantially rectangular shape and not-illustrated wiring provided on the flat plate. The light sources 12 are LEDs and arranged on the substrate 11. In the example illustrated in the drawings, a plurality of light sources 12 are arranged such that the centers of the light sources 12 are located at the vertices of a rectangle on the substrate 11. It is preferable that a surface on which the light sources 12 are arranged of the substrate 11 is, for example, colored in white or other color, or formed with a white or other material, or a reflective sheet is affixed to or placed on the surface to facilitate reflection of light. Alternatively, a reflective sheet may be affixed to a surface of the light guide plate 13 facing the substrate 11. However, these measures for reflection are not necessarily performed.

The light guide plate 13 is arranged in proximity to a surface of the substrate 11, the surface having the light sources 12 (in the present embodiment, the light guide plate 13 is arranged over the substrate 11 with a not-illustrated reflective sheet interposed). The light guide plate 13 is, for example, formed of a transparent resin and has a plurality of through holes for the light sources 13c provided in the thickness direction, and a plurality of through holes for pseudo light sources 13d provided in the thickness direction, respectively. Main surfaces 13a and 13b on both sides of the light guide plate 13 having the through holes 13c and 13d are smooth surfaces, except for the portions of the through holes 13c and 13d.

The light sources 12 on the substrate 11 are accommodated in the through holes for the light sources 13c. The light sources 12 are not accommodated in the through holes for the pseudo light sources 13d. It should be noted that, for explanation of the principle, the number of the through holes for the light sources and the number of the through holes for the pseudo light sources are respectively few in the drawings, but there are more in actuality. Furthermore, although not illustrated, an optical sheet such as a diffusion sheet or a prism sheet is disposed on a surface of the light guide plate 13, the surface being the opposite side to the side facing the substrate 11.

Figure 2A:
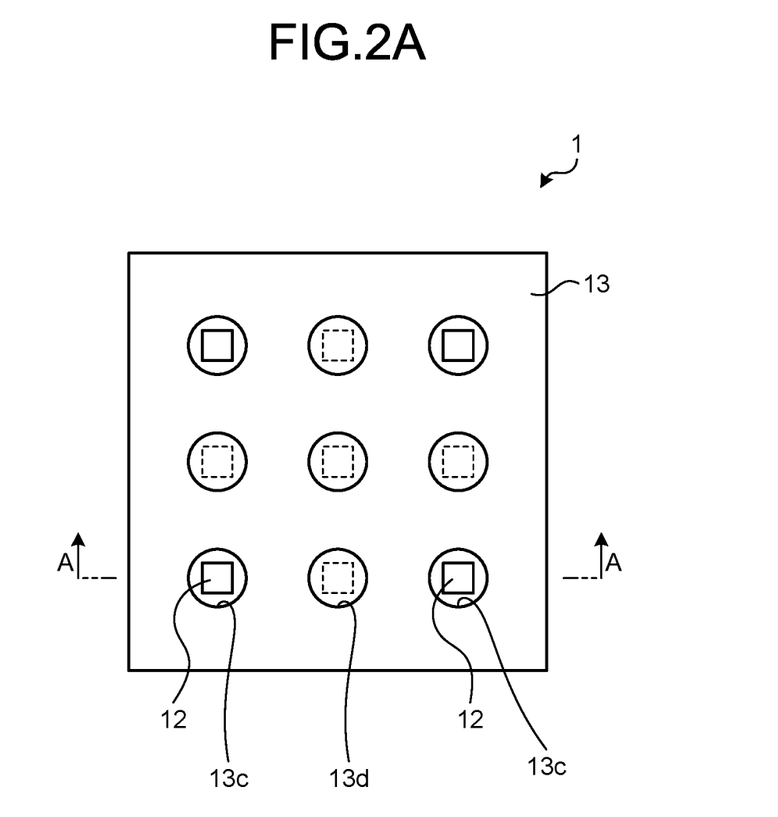
FIG. 2A is a first diagram illustrating a state in which light sources emit light.
Figure 2B:
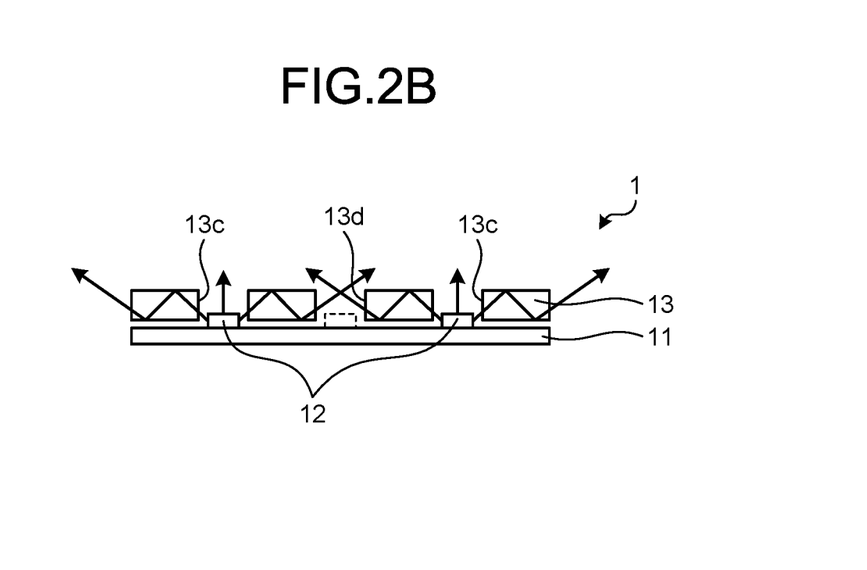
FIG. 2B is a second diagram illustrating a state in which light sources emit light.

FIG. 2A and FIG. 2B are diagrams illustrating a state in which the light sources 12 emit light, in which FIG. 2A is a plan view (top view) of the planar illumination device 1 and FIG. 2B is an end elevation view along A-A in FIG. 2A. In FIG. 2A and FIG. 2B, part of light emitted from the light sources 12 accommodated in the through holes for the light sources 13c is emitted directly through the through holes 13c, while another part of light enters the light guide plate 13 through the wall surfaces of the through holes 13c and is reflected repeatedly and emitted through the end surfaces of the light guide plate 13 and the wall surfaces of the through holes for the pseudo light sources 13d. The through holes for the pseudo light sources 13d thus also function as light sources in the same manner as those having light sources accommodated therein.

Figure 3:
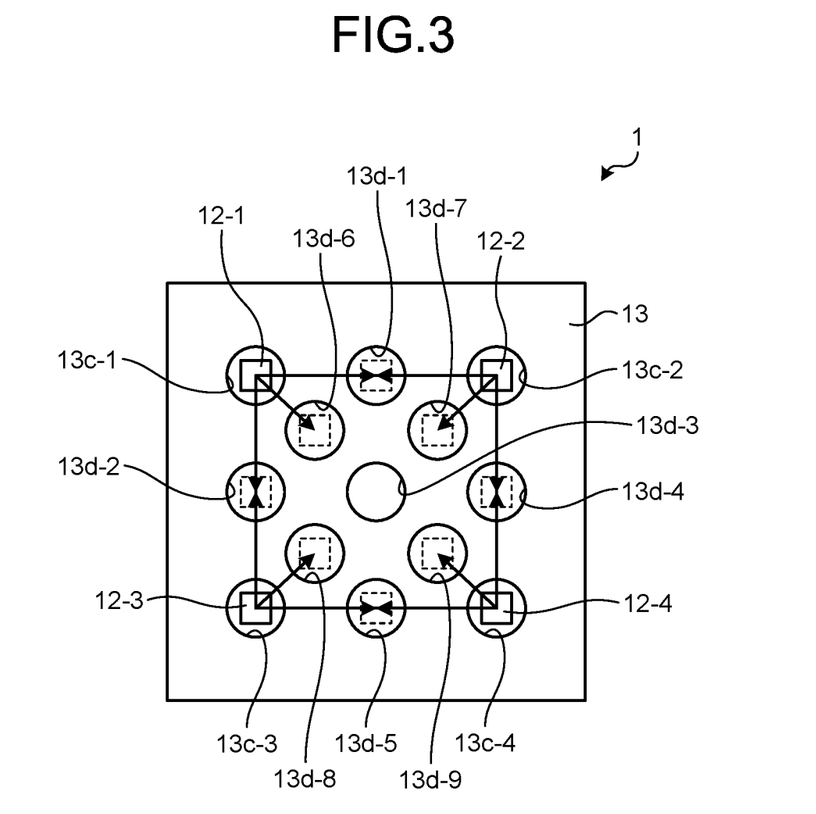
FIG. 3 is a diagram illustrating an exemplary arrangement relation between through holes for the light sources and through holes for the pseudo light sources.

FIG. 3 is a diagram illustrating an exemplary arrangement relation between the through holes for the light sources and the through holes for the pseudo light sources. In FIG. 3, light sources 12-1 to 12-4 are accommodated in the through holes for the light sources 13c-1 to 13c-4 in the light guide plate 13 of the planar illumination device 1. Here, the through holes 13d-6 to 13d-9 should not be provided in order that the through hole 13d-3 for the pseudo light source, which is located at the center of a rectangular region surrounded by the through holes 13c-1 to 13c-4, functions normally as a pseudo light source.

For example, if the through hole 13d-6 is provided, light coming from the light source 12-1 through the through hole for the light source 13c-1 is emitted from the through hole 13d-6 and fails to reach the through hole for the pseudo light source 13d-3. This is applicable to the other through holes 13d-7 to 13d-9. Based on this, a through hole for the pseudo light source should be arranged such that another pseudo light source is not arranged on a line connecting the center of the through hole for the pseudo light source and the center of one of a plurality of light sources. Pseudo light sources can be easily realized by providing the through holes in consideration of arrangement.

Figure 4:
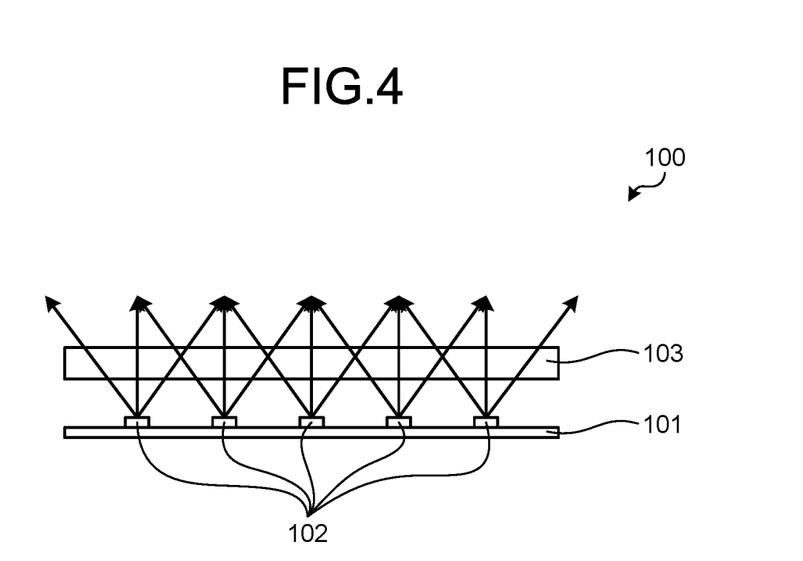
FIG. 4 is a first cross-sectional view illustrating a configuration example of a planar illumination device of a comparative example.

FIG. 4 is a cross-sectional view illustrating a configuration example of a planar illumination device 100 of a comparative example. In FIG. 4, a plurality of light sources 102 are arranged on a substrate 101, and an optical sheet 103 such as a diffusion sheet or a prism sheet is provided at a distance from the light sources 102 on a surface side having the light sources 102 of the substrate 101. In FIG. 4, in order to prevent unevenness in brightness of emission light passed through the optical sheet 103, the number of light sources 102 on the substrate 101 is increased and the spacing between the light sources 102 is narrowed. However, this configuration increases the number of light sources 102 and incurs a cost increase.

In this respect, in the embodiment illustrated in FIG. 1A and FIG. 2A, since the pseudo light sources function as light sources in addition to the actual light sources 12, an effect similar to the arrangement of a large number of light sources with small spacings can be achieved, and occurrence of unevenness in brightness can be prevented without incurring a cost increase of the planar illumination device.

Figure 5:
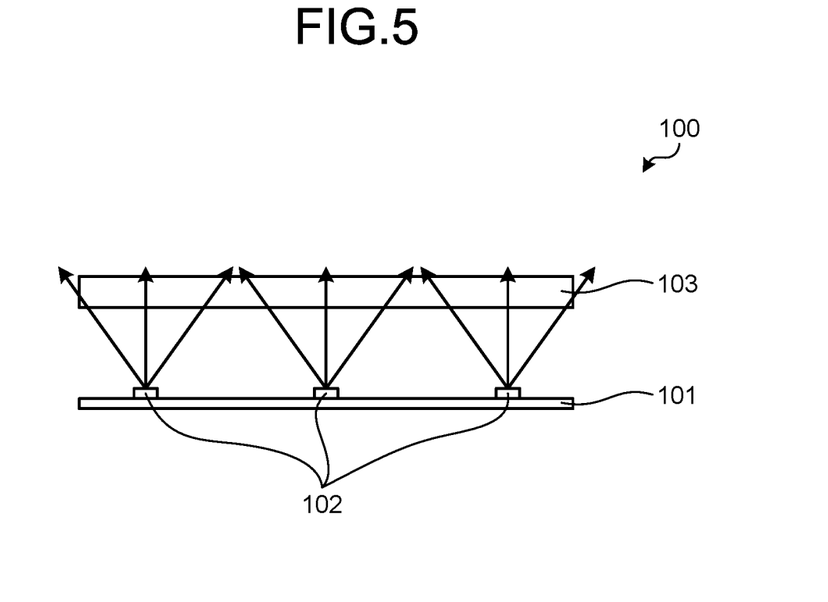
FIG. 5 is a second cross-sectional view illustrating a configuration example of the planar illumination device of the comparative example.

FIG. 5 is a cross-sectional view illustrating another configuration example of the planar illumination device 100 of a comparative example. In FIG. 5, a plurality of light sources 102 are arranged on a substrate 101, and an optical sheet 103 such as a diffusion sheet or a prism sheet is provided at a distance from the light sources 102 on a surface side having the light sources 102 of the substrate 101. In FIG. 5, in order to prevent unevenness in brightness of emission light passed through the optical sheet 103, the distance between the light sources 102 and the optical sheet 103 is increased so that light from the light sources 102 expands and is incident on the optical sheet 103. More specifically, unless the distance between the light sources 102 and the optical sheet 103 is increased, light from the light sources 102 is incident on the optical sheet 103 before sufficiently expanding, and the gap between the light source 102 and the other light source 102 becomes dark, causing unevenness in brightness. However, the increase of the distance between the light sources 102 and the optical sheet 103 increases the thickness of the planar illumination device, resulting in a failure to meet the need for reducing the thickness.

In this respect, the embodiment illustrated in FIG. 1A and FIG. 2A includes pseudo light sources to achieve an effect similar to the arrangement of a large number of light sources with small spacings and does not require the increased distance between the light sources and the optical sheet in order to prevent occurrence of unevenness in brightness and, therefore, the embodiment is suitable for reducing the thickness of the planar illumination device.

Second Embodiment

Figure 6:
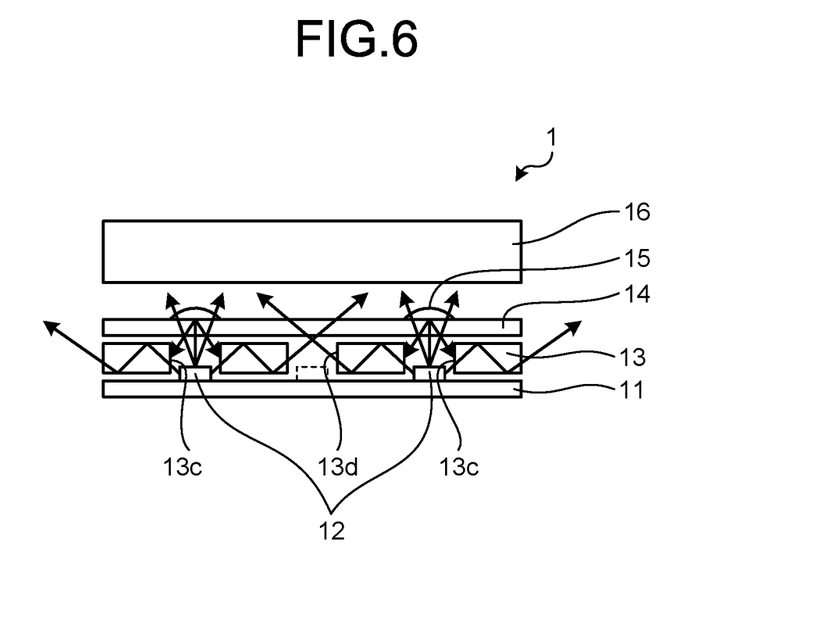
FIG. 6 is a cross-sectional view illustrating a configuration example of the planar illumination device according to a second embodiment.

FIG. 6 is a cross-sectional view illustrating a configuration example of the planar illumination device 1 according to a second embodiment, specifically an end elevation view through the light sources 12 and the through holes 13c and 13d. In FIG. 6, the substrate 11, the light sources 12, and the light guide plate 13 are similar to those in FIG. 1A. In FIG. 6, the difference lies in that reflective members 15 are provided at positions corresponding to the through hole for the light sources s 13c, on a surface of an optical sheet 14, the surface being the opposite side to the side facing the light guide plate 13, where the optical sheet 14 is provided on a surface of the light guide plate 13, the surface being the opposite side to the side facing the light sources 12. Another optical sheet 16 is provided on a surface of the optical sheet 14, the surface being the opposite side to the side facing the light guide plate 13. The optical sheets 14 and 16 each may be formed with one sheet or may be formed with a plurality of sheets.

The reflective members 15 do not reflect all of the light passing through the through hole 13c from the light source 12 and allows part of the light to pass through. The reflective members 15, for example, can be easily formed by printing a paint having a light-reflecting property in a circular shape on the optical sheet 14, and the ratio between the amount of reflected light and the amount of transmitted light can be adjusted by varying the thickness of print between the central portion and the peripheral portion. Alternatively, the reflectivity can be increased at the central portion and the transmissivity can be increased at the peripheral portion by concentrically superimposing a reflective member having a small diameter on a reflective member having a large diameter.

In the configuration in FIG. 6, part of light emitted from the light source 12 accommodated in the through hole 13c for the light source and passing through the through hole 13c is reflected by the reflective members 15 and enters the light guide plate 13 through the wall surface of the through hole 13c. Hence, the balance between the amount of light directly emitted from the light source 12 through the through hole 13c for the light source and the amount of light emitted from the through hole 13d can be adjusted, and unevenness in brightness can be further reduced.

Third Embodiment

In the foregoing second embodiment, the reflective members 15 provided at the positions corresponding to the through holes for the light sources 13c adjust the balance between the amount of light directly emitted through the through holes for the light sources 13c and the amount of light emitted from the through holes for the pseudo light sources 13d, thereby reducing unevenness in brightness. However, the part other than the through holes for the light sources 13c does not have the reflective members 15, despite having a large area, and is unable to directly adjust the amount of emitted light. Hence, reduction of unevenness in brightness may be insufficient in some cases. Since there is no actual light sources corresponding to the through holes for the pseudo light sources 13d, the reflective members 15 are not provided at the positions corresponding to the through holes for the pseudo light sources 13d.

Figure 7A:
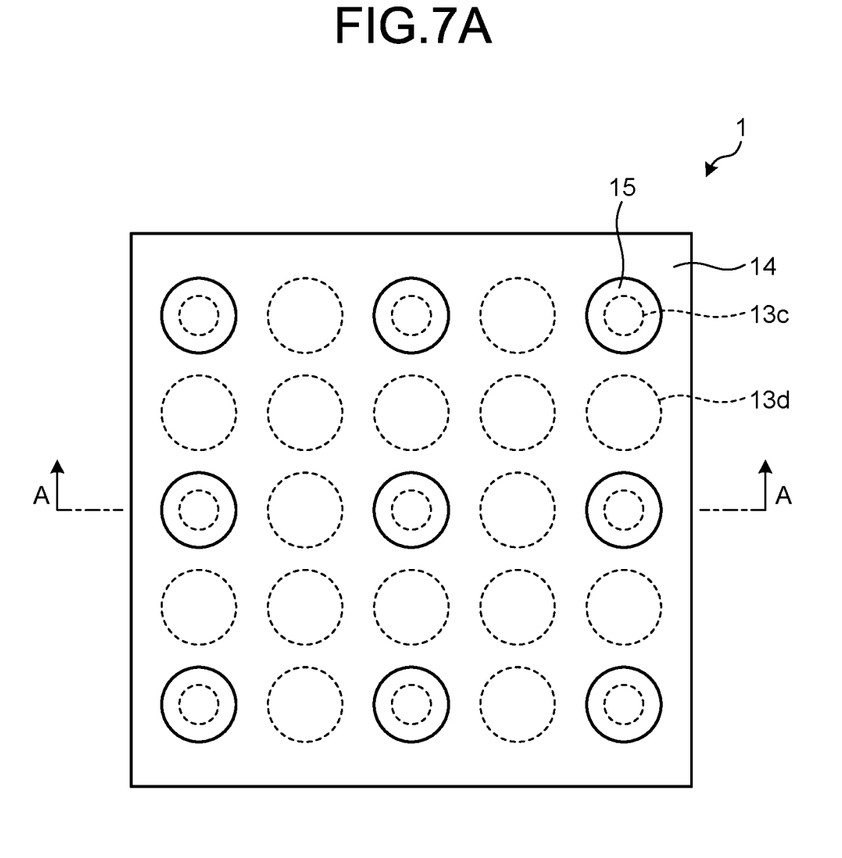
FIG. 7A is a first diagram illustrating a configuration example of the planar illumination device according to a third embodiment.
Figure 7B:
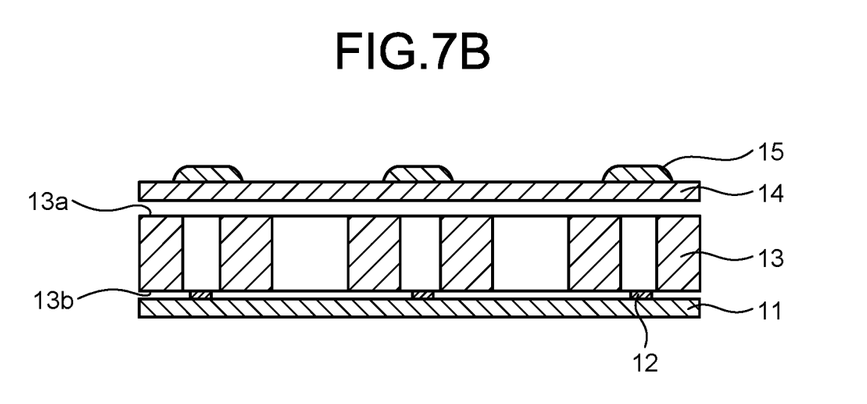
FIG. 7B is a second diagram illustrating a configuration example of the planar illumination device according to the third embodiment.

FIG. 7A and FIG. 7B are diagrams illustrating a configuration example of the planar illumination device 1 according to a third embodiment. FIG. 7A is a plan view of the planar illumination device 1 and FIG. 7B is a cross-sectional view along A-A in FIG. 7A. The arrangement of the substrate 11, the light sources 12, the light guide plate 13, the optical sheet 14, and the reflective members 15 is similar to that illustrated in FIG. 6. The difference lies in that an upper main surface 13a or a lower main surface 13b or both of the main surfaces 13a and 13b in the drawing of the light guide plate 13 are subjected to processing for imparting a function of diffusing light. This processing is performed, for example, by forming a large number of minute and random dots (beads) on a surface. The light guide plate 13 may be formed by providing the through holes for the light sources 13c and the through holes for the pseudo light sources 13d in a plate material subjected to the processing in advance to serve as a diffusion plate. Alternatively, the through holes for the light sources 13c and the through hole 13d for the pseudo light source may be provided in a transparent plate in advance and thereafter the processing for diffusion may be performed.

The brightness of the processed part can be adjusted by varying the pitches of the dots in the processing for diffusion. The larger the pitches are, the smaller the diffusion effect is, and the smaller the pitches are, the greater the diffusion effect is. For example, the diffusion effect increases and the brightness decreases in the order of no dots→pitches of 70 μm→pitches of 60 μm→pitches of 50 μm→pitches of 40 μm.

Furthermore, the surface state of the light guide plate 13 can be identified and controlled using a HAZE value indicating the degree of diffusion. Although diffusion plates having HAZE values of 30.0%, 35.0%, 50%, 72%, and 79% are distributed, a higher HAZE value is not always good, and those that make less noticeable hot spots corresponding to the through holes for the light sources 13c and the through holes for the pseudo light sources 13d and enhance the appearance are selected. An experiment by the inventor has demonstrated that the light guide plate 13 using a diffusion plate with a HAZE value of 30.0% provides good appearance. On the other hand, it has been demonstrated that the light guide plate 13 subjected to the processing for diffusion clearly enhances brightness and improves in efficiency, compared with the light guide plate 13 not subjected to the processing for diffusion. It has also been demonstrated that the brightness tends to be high with a higher HAZE value.

As discussed above, the processing for imparting the function of diffusion light on the main surface 13a or the main surface 13b, or both of the main surfaces 13a and 13b of the light guide plate 13 can adjust the brightness between the adjacent through holes for the light sources 13c, thereby further reducing unevenness in brightness.

Although the reflective members 15 are provided at positions corresponding to the through holes for the light sources 13c on the optical sheet 14 in FIG. 7A and FIG. 7B, the reflective members 15 are not necessarily provided and the processing for imparting the function of diffusing light may be performed on the main surface 13a or the main surface 13b, or both of the main surfaces 13a and 13b of the light guide plate 13.

Fourth Embodiment

Figure 8:
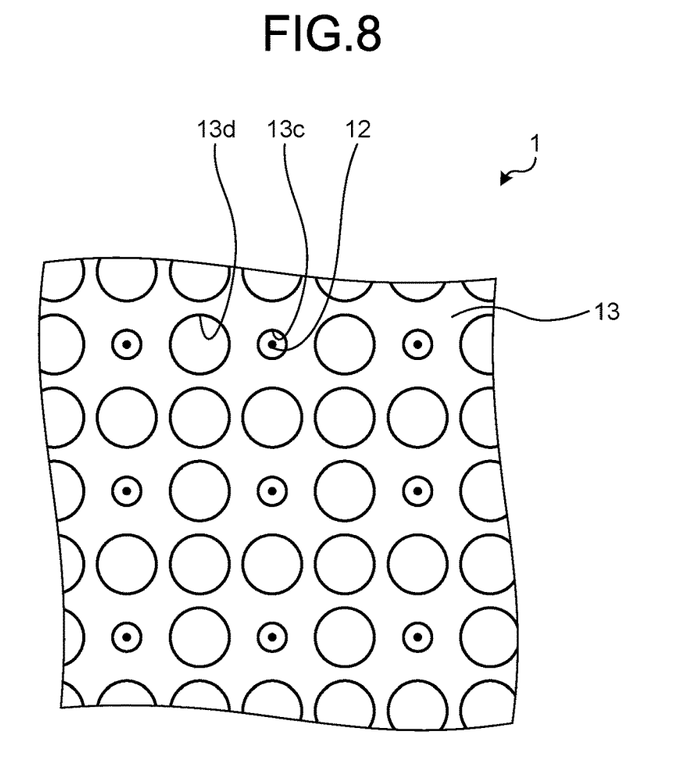
FIG. 8 is a diagram illustrating a configuration example of the planar illumination device according to a fourth embodiment.

FIG. 8 is a diagram illustrating a configuration example of the planar illumination device 1 according to a fourth embodiment, specifically illustrating a part of the light guide plate 13 in a plan view. In FIG. 8, the light guide plate 13 has a plurality of through holes for the light sources 13c that accommodate the light sources 12 and a plurality of through holes for the pseudo light sources 13d, the diameter of the through hole 13d for the pseudo light source differs from the diameter of the through hole for the light sources 13c, and the balance of the amount of light between the light sources and the pseudo light sources can be adjusted.

Furthermore, the diameter of the through hole for the pseudo light source 13d is greater than the diameter of the through hole for the light source 13c. The through hole for the light source 13c captures light from the light source 12, whereas the through hole 13d for the pseudo light source serves as a pseudo light source to emit light and, therefore, the through hole for the pseudo light source 13d having a greater diameter achieves higher efficiency and higher uniformity of light. In this respect, the reduction of unevenness in brightness has also been verified by experiments.

Fifth Embodiment

Figure 9:
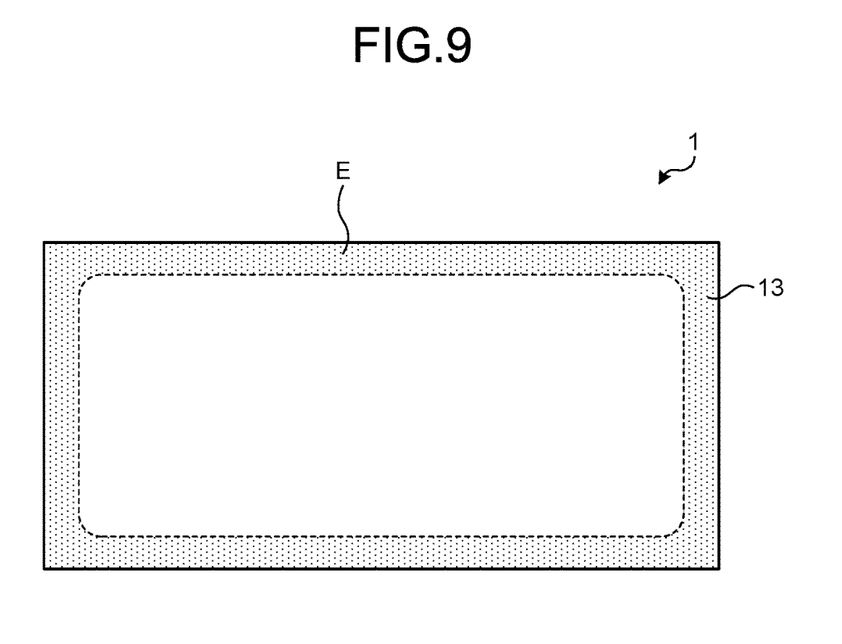
FIG. 9 is a diagram illustrating a configuration example of the planar illumination device according to a fifth embodiment.

FIG. 9 is a diagram illustrating a configuration example of the planar illumination device 1 according to a fifth embodiment, specifically illustrating the entire planar illumination device 1 in a plan view. In FIG. 9, the diameter of the through hole for the light source 13c and the diameter of the through hole for the pseudo light source 13d differ between a peripheral portion E and the other portion (the portion excluding the peripheral portion E of the main surface of the light guide plate 13, more specifically, the inside portion of the peripheral portion E) of the light guide plate 13 of the planar illumination device 1. Furthermore, the spacing in which the through holes for the light sources 13c are arranged and the spacing in which the through holes for the pseudo light sources 13d are arranged may differ between the peripheral portion E and the other portion of the light guide plate 13 of the planar illumination device 1.

In the through holes for the pseudo light sources 13d in the portion excluding the peripheral portion E, light enters substantially uniformly from the surrounding and a constant amount of light can be emitted, whereas in the peripheral portion E, the amount of light entering from the surrounding varies, so that the amount of light emitted from the through holes for the pseudo light sources 13d may be insufficient. Hence, the diameter of and/or the spacing in which the through holes for the light sources 13c are arranged and the diameter of and/or the spacing in which the through holes for the pseudo light sources 13d are arranged in the peripheral portion E are varied from those in the other portion (the diameter is increased and the spacing is reduced), whereby the amount of light is adjusted, and unevenness in brightness can be reduced.

Sixth Embodiment

In the foregoing embodiments, the centers of the light sources are arranged at the vertices of a rectangle on the substrate. However, the present invention is not limited to such arrangement.

Figure 10:
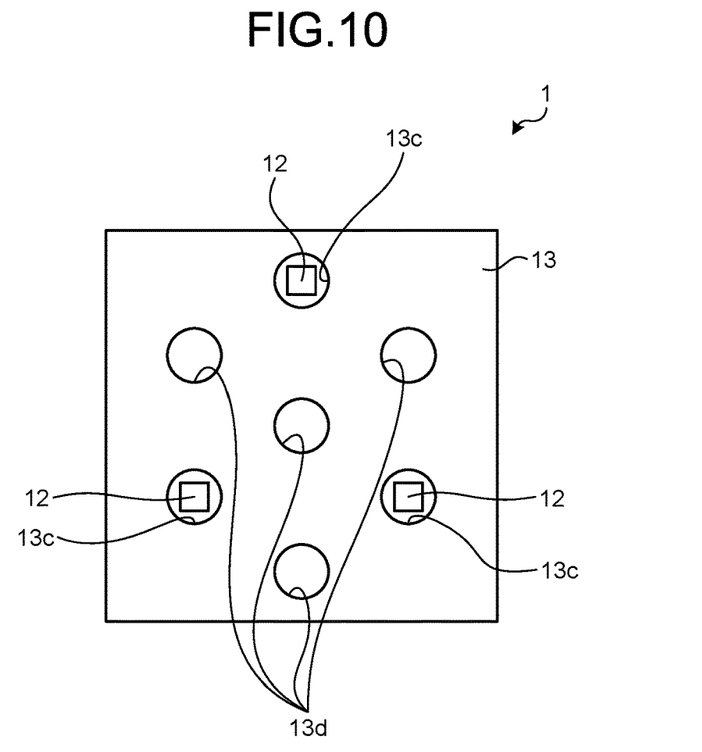
FIG. 10 is a diagram illustrating a configuration example of the planar illumination device according to a sixth embodiment.

FIG. 10 is a diagram illustrating a configuration example of the planar illumination device 1 according to a sixth embodiment, specifically a plan view (top view) of the planar illumination device 1. In FIG. 10, a plurality of light sources 12 are arranged such that the center of each light source 12 is located at a vertex of a triangle on the substrate (11). The light guide plate 13 has a plurality of through holes for the light sources 13c corresponding to light sources 12 and a plurality of through holes for the pseudo light sources 13d. Each through hole for the pseudo light source 13d is provided such that another pseudo light source is not arranged on a line connecting the center of the through hole for the pseudo light source 13d and the center of one of a plurality of light sources 12. It should be noted that, for explanation of the principle, the number of the through holes for the light sources and the number of the through holes for the pseudo light sources are respectively few in the drawing, but there are more in actuality.

Seventh Embodiment

In the foregoing embodiments, one through hole for the pseudo light source is present on a line connecting two through holes for the light sources on the substrate (FIG. 1A, FIG. 8), or no through holes for the pseudo light sources are present on a line connecting two through holes for the light sources on the substrate (FIG. 10). However, the present invention is not limited thereto.

Figure 11:
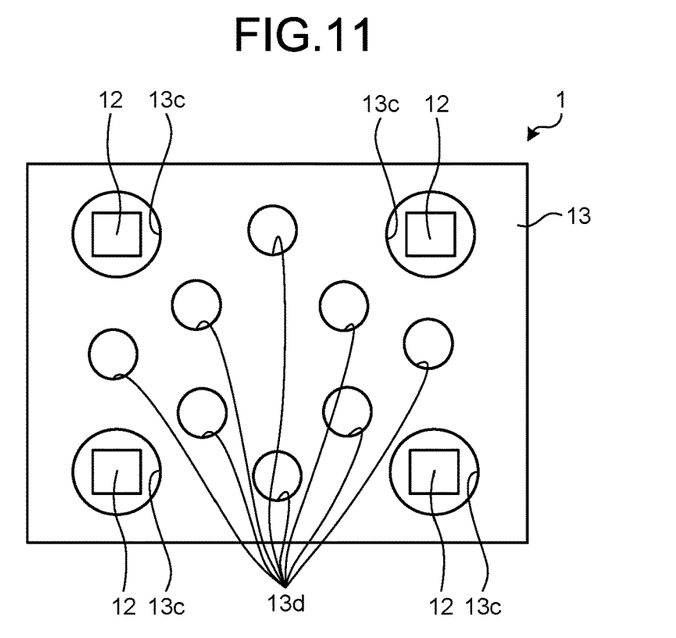
FIG. 11 is a diagram illustrating a configuration example of the planar illumination device according to a seventh embodiment.

FIG. 11 is a diagram illustrating a configuration example of the planar illumination device 1 according to a seventh embodiment, specifically a plan view (top view) of the planar illumination device 1. In FIG. 11, through holes 13c are provided in the light guide plate 13 so as to be located at four vertices of a rectangle, and light sources 12 are provided to be located in the inside of the respective through holes 13c. Inside the rectangle surrounded by four through holes 13c, in total, eight through holes for the pseudo light sources 13d are provided. In this example, eight through holes 13d have the same diameter. The brightness of the pseudo light sources can be adjusted by adjusting the diameter of the through holes 13d. Each through hole for the pseudo light source 13d is provided such that another pseudo light source is not arranged on a line connecting the center of the through hole for the pseudo light source 13d and the center of one of a plurality of light sources 12. It should be noted that, for explanation of the principle, the number of the through holes for the light sources and the number of the through holes for the pseudo light sources are few in the drawings but there are more in actuality.

Eighth Embodiment

In an eighth embodiment, the diameter of the through holes for the pseudo light sources in the seventh embodiment is varied.

Figure 12:
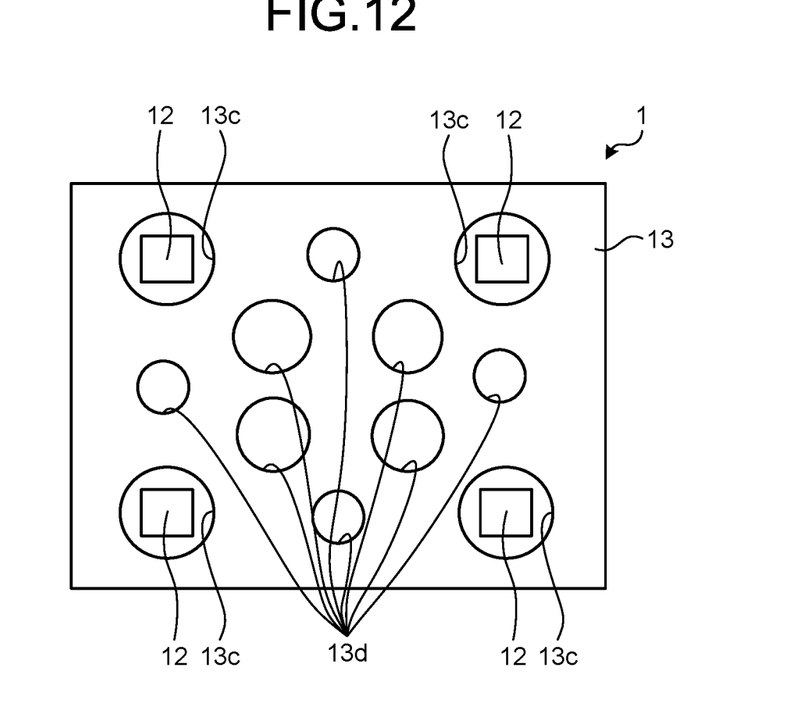
FIG. 12 is a diagram illustrating a configuration example of the planar illumination device according to an eighth embodiment.

FIG. 12 is a diagram illustrating a configuration example of the planar illumination device 1 according to the eighth embodiment, specifically a plan view (top view) of the planar illumination device 1. In FIG. 12, through holes 13c are provided in the light guide plate 13 so as to be located at four vertices of a rectangle, and light sources 12 are provided to be located in the inside of the respective through holes 13c. Inside the rectangle surrounded by four through holes 13c, in total, eight through holes for the pseudo light sources 13d are provided. In this example, among eight through holes 13d, four at the central portion of the rectangle have a large diameter, and the surrounding four have a small diameter. The brightness of the pseudo light sources can be adjusted by adjusting the diameter of the through holes 13d. Each through hole 13d for the pseudo light source is provided such that another pseudo light source is not arranged on a line connecting the center of the through hole 13d for the pseudo light source and the center of one of a plurality of light sources 12. It should be noted that, for explanation of the principle, the number of the through holes for the light sources and the number of the through holes for the pseudo light sources are few in the drawings but there are more in actuality.

Although embodiments of the present invention have been described above, the present invention is not limited to the foregoing embodiments and susceptible to various modifications without departing from the spirit of the invention.

As described above, the planar illumination device according to embodiments includes a substrate having a plurality of light sources arranged two-dimensionally, and a light guide plate disposed on a side of a surface of the substrate, the surface having the light sources. The light guide plate has a plurality of through holes provided in a thickness direction and individually accommodating the light sources, and a pseudo light source. The pseudo light source is arranged such that another pseudo light source is not arranged on a line connecting the center of the pseudo light source and the center of one of a plurality of light sources. This arrangement can reduce unevenness in brightness without increasing the number of light sources or the thickness of the device.

Furthermore, the pseudo light source is a through hole provided in the thickness direction of the light guide plate and not accommodating the light source. In this configuration, the pseudo light source can be easily provided.

Furthermore, the planar illumination device further includes a reflective member disposed on the side of the light guide plate, the side being opposite to the side facing the substrate, corresponding to the opening of the through hole that accommodates the light source. This configuration can adjust the balance between light directly emitted from the light source and light emitted from the pseudo light source and can further reduce unevenness in brightness.

Furthermore, the reflective member is provided on an optical sheet disposed on the side of the light guide plate, the side being opposite to the side facing the substrate. In this configuration, the reflective member can be easily provided.

Furthermore, a central portion of the reflective member has a high reflectivity and a peripheral portion of the reflective member has a high transmissivity. This configuration can adjust the amount of light used for the pseudo light source while keeping the function of the light source.

Furthermore, a main surface on the emission surface side of the light guide plate or a main surface on the side opposite to the emission surface side, or the main surface on the emission surface side and the main surface on the side opposite to the emission surface side are subjected to processing for diffusing light. This configuration can further reduce unevenness in brightness.

Furthermore, a plurality of light sources are arranged such that the centers of the light sources are located on the vertices of a rectangle on the substrate. This configuration can easily realize two-dimensional arrangement of the light sources.

Furthermore, a plurality of light sources are arranged such that the centers of the light sources are located on the vertices of a triangle on the substrate. This configuration can easily realize two-dimensional arrangement of the light sources.

Furthermore, the diameter of the through hole that accommodates the light source differs from the diameter of the through hole that does not accommodate the light source. This configuration can adjust the balance of the amount of light between the light sources and the pseudo light sources.

Furthermore, the diameter of the through hole that does not accommodate the light source is larger than the diameter of the through hole that accommodates the light source. This configuration can reduce unevenness in brightness.

Furthermore, the diameter of the through hole that accommodates the light source and the diameter of the through hole that does not accommodate the light source differ between a peripheral portion and the other portion of a light emission surface. This configuration can reduce unevenness in brightness between the peripheral portion and the other portion of the light emission surface.

Furthermore, the spacing in which the through holes that accommodate the light sources are arranged and the spacing in which the through holes that do not accommodate the light sources are arranged differ between a peripheral portion and the other portion of a light emission surface. This configuration can reduce unevenness in brightness between the peripheral portion and the other portion of the light emission surface.

It should be noted that the present invention is not limited by the foregoing embodiments. A configuration including the above-noted constituent elements combined as appropriate is also included in the present invention. Furthermore, additional advantages and modifications can be easily derived by those skilled in the art. Therefore, a broader aspect of the present invention is not limited to the foregoing embodiments and various modifications can be made.

REFERENCE SIGNS LIST 1 planar illumination device
11 substrate
12, 12-1 to 12-4 light source
13 light guide plate
13a, 13b main surface
13c, 13c-1 to 13c-4 through hole (for light source)
13d, 13d-1 to 13d-4 through hole (for pseudo light source)
14, 16 optical sheet
15 reflective member
E peripheral portion

The invention claimed is:
1. A planar illumination device comprising:
a substrate having a plurality of light sources arranged two-dimensionally; and
a light guide plate disposed on a side of a surface of the substrate, the surface having the light sources, wherein
the light guide plate has a plurality of through holes and a pseudo light source, the through holes being arranged in a thickness direction and individually accommodating the light sources, and each of the pseudo light sources is a through hole arranged in the thickness direction of the light guide plate and not accommodating the light source, and the pseudo light source is arranged such that another pseudo light source is not arranged on a line connecting a center of the pseudo light source and each of centers of at least one light source of the light sources the through holes are arranged in a lattice shape, and on a line connecting two adjacent light source sources, only one pseudo light source is arranged between the two light sources.

2. The planar illumination device according to claim 1, further comprising a reflective member disposed on a side of the light guide plate, the side being opposite to a side facing to the substrate, the reflective member corresponding to an opening of the through hole that accommodates the light source.

3. The planar illumination device according to claim 2, wherein the reflective member is provided on an optical sheet disposed on the side of the light guide plate, the side being opposite to the side facing the substrate.

4. The planar illumination device according to claim 3, wherein a central portion of the reflective member has a high reflectivity and a peripheral portion of the reflective member has a high transmissivity.

5. The planar illumination device according to claim 2, wherein a central portion of the reflective member has a high reflectivity and a peripheral portion of the reflective member has a high transmissivity.

6. The planar illumination device according to claim 1, wherein a main surface on an emission surface side of the light guide plate or a main surface on a side opposite to a side of the emission surface, or both of the main surface on the emission surface side and the main surface on the side opposite to the side of the emission surface are subjected to processing for diffusing light.

7. The planar illumination device according to claim 1, wherein the light sources are arranged such that centers of the light sources are located at vertices of a rectangle on the substrate.

8. The planar illumination device according to claim 1, wherein the light sources are arranged such that centers of the light sources are located at vertices of a triangle on the substrate.

9. The planar illumination device according to claim 1, wherein a diameter of the through hole that accommodates the light source differs from a diameter of each of the pseudo light sources.

10. The planar illumination device according to claim 9, wherein a diameter of each of the pseudo light sources is larger than a diameter of the through hole that accommodates the light source.

11. The planar illumination device according to claim 1, wherein a diameter of the through hole that accommodates the light source differs between a peripheral portion of a light emission surface and another portion, and a diameter of each of the pseudo light sources differs between a peripheral portion of a light emission surface and another portion.

12. The planar illumination device according to claim 1, wherein spacing in which the through holes that accommodate the light sources are arranged differ between a peripheral portion of a light emission surface and another portion and spacing in which each of the pseudo light sources are arranged differ between a peripheral portion of a light emission surface and another portion.

13. The planar illumination device according to claim 1, wherein one pseudo light source is arranged between adjacent light sources, and a diameter of the through hole that does not accommodate the light source is larger than a diameter of the through hole that accommodates the light source.

14. A planar illumination device comprising:
a substrate having a plurality of light sources arranged two-dimensionally;
a light guide plate disposed on a side of a surface of the substrate, the surface having the light sources, wherein
the light guide plate has a plurality of through holes and a pseudo light source, the through holes being arranged in a thickness direction and individually accommodating the light sources, and each of the pseudo light sources is a through hole arranged in the thickness direction of the light guide plate and not accommodating the light source, and
a reflective member is disposed corresponding to an opening of each of the through holes that accommodates the light source, and is not disposed corresponding to an opening of each of the pseudo light sources.

15. A planar illumination device comprising:
a substrate having a plurality of light sources arranged two-dimensionally; and
a light guide plate disposed on a side of a surface of the substrate, the surface having the light sources, wherein
the light guide plate has a plurality of through holes and a pseudo light source, the through holes being arranged in a thickness direction and individually accommodating the light sources, and each of the pseudo light sources is a through hole arranged in the thickness direction of the light guide plate and not accommodating the light source, and
a diameter of the pseudo light source is larger than a diameter of the through hole that accommodates the light source.

16. The planar illumination device according to claim 15, wherein the pseudo light source is arranged such that another pseudo light source is not arranged on a line connecting a center of the pseudo light source and each of centers of at least one light source of the light sources.

* * * * *